Patented Mar. 31, 1931

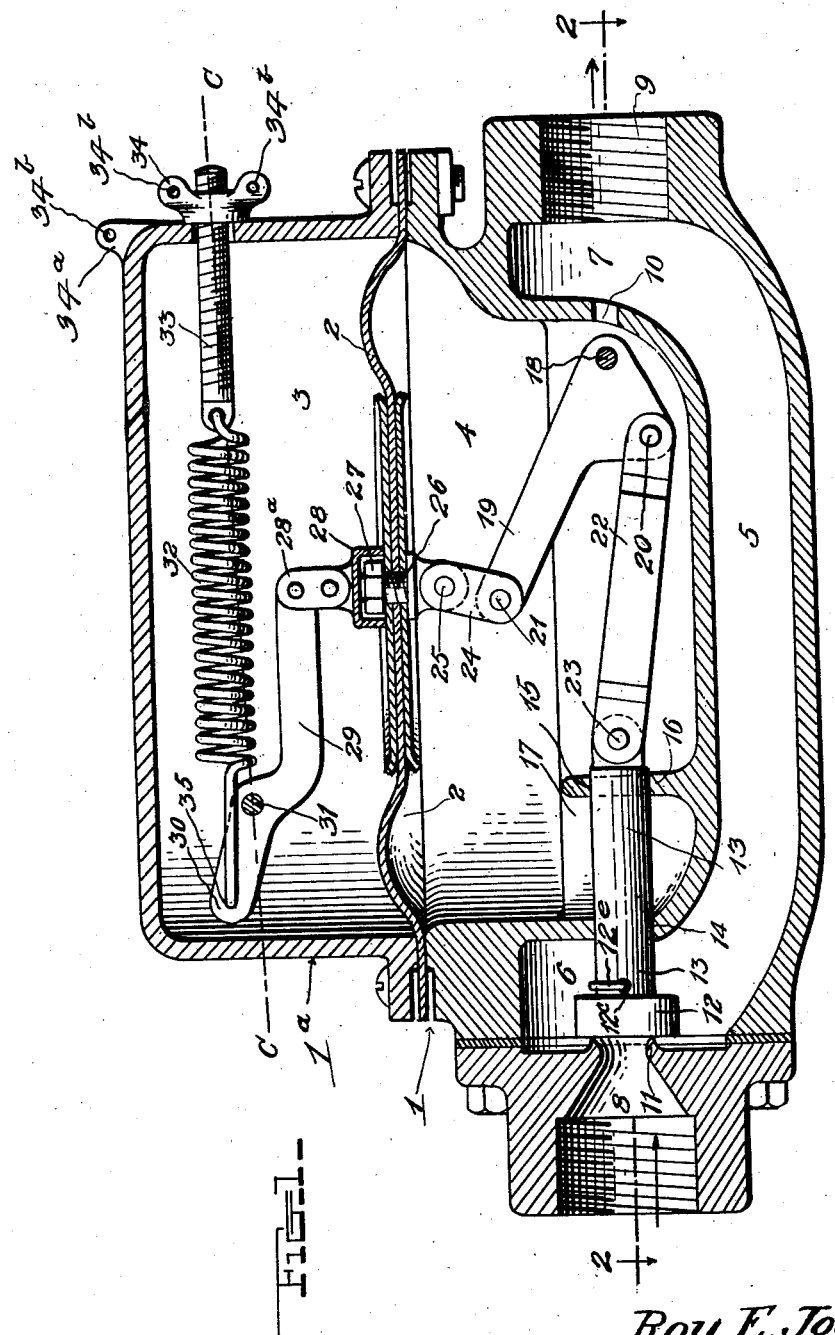

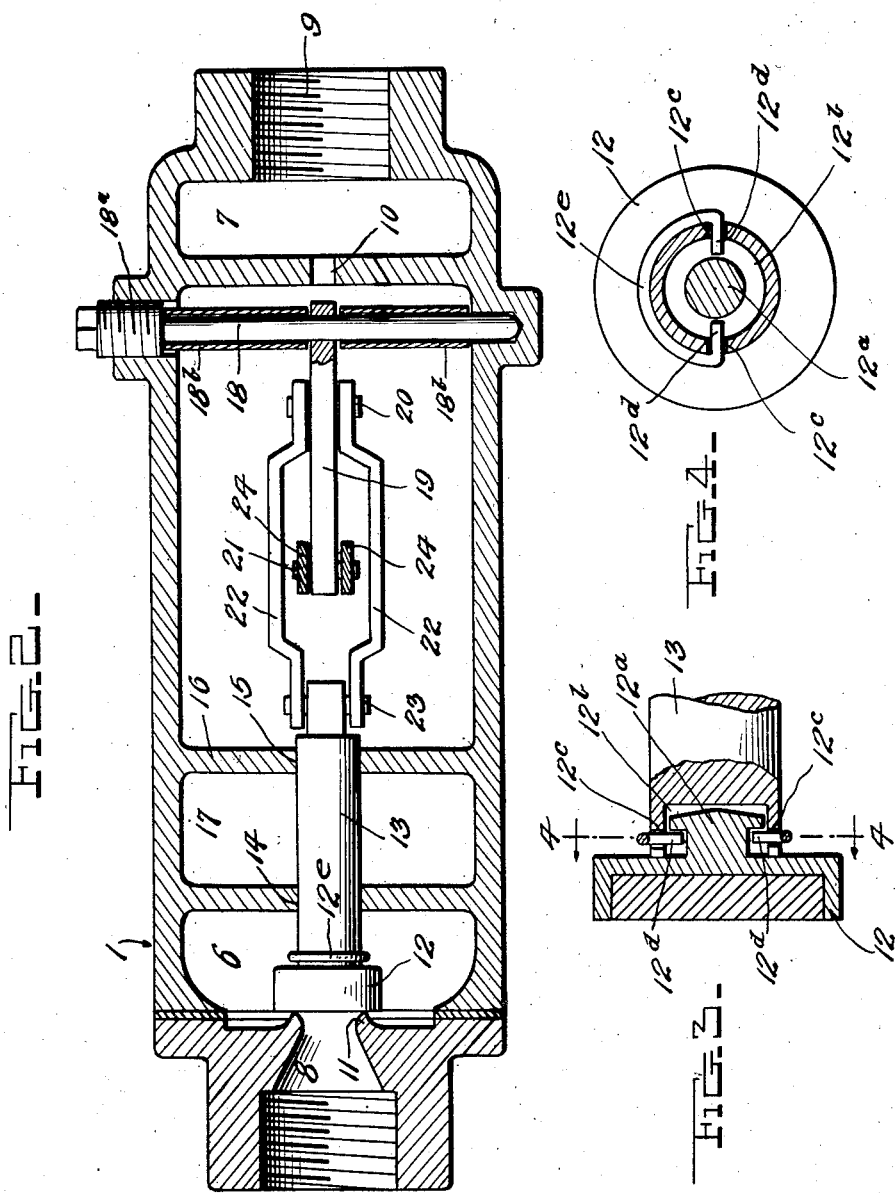

1,798,377

UNITED STATES PATENT OFFICE

ROY E. JOYCE, OF EAST LOS ANGELES, CALIFORNIA

PRESSURE REGULATOR

Application filed June 30, 1930. Serial No. 464,979.

Conventional pressure regulators embody a flow controlling valve, a diaphragm for closing said valve, said diaphragm being movable in valve-closing direction under the influence of pressure at the discharge side of the regulator, and a spring for opening the valve when the diaphragm permits. When relatively small volume flow is taking place through the regulator, due for instance to only partial opening of a discharge valve in the fluid line or to opening of only a few of a number of such discharge valves, the pressure acting on the diaphragm is comparatively high and consequently the valve is open only a small amount, with the valve-opening spring at almost maximum strength and capable of co-acting with the diaphragm to regulate the discharge pressure. Upon large-volume flow however, for instance at a peak of consumption, the pressure acting on the diaphragm promptly decreases and the valve is further opened by the spring. This is of course intended to admit more pressure to the line at the discharge side of the regulator to steadily supply the demand, but this result is not in reality attained, for the following reason. As the spring opens the valve, said spring of course expends energy and weakens so that only a very weak spring force holds the valve open. Consequently, the increased pressure admitted to the regulator upon opening of the valve, immediately overcomes this weak spring force and moves the diaphragm in valve closing direction, again cutting down the pressure discharged from the regulator, with an appreciable decrease in pressure obtained at the outlet or outlets of the line. It will thus be seen that the regulators of today, instead of supplying the fluid at high pressure for large volume flow when most needed, accomplish the exact reverse.

Another drawback with conventional regulators, is caused by the action of so-called dynamic pressure upon the diaphragm. The pressure enters through a valved orifice and creates a result very similar to that at the nozzle of a garden hose. With the hose, the liquid expands as soon as it leaves the nozzle but still has considerable pressure some distance away. Gas entering through the valved orifice of a regulator also immediately expands but at some distance is still under considerable pressure, full of eddies and much agitated, this pressure being known as dynamic pressure. It is very erratic and uncontrollable, varying directly with the volume of flow. In the usual pressure regulators, this dynamic pressure acts against the diaphragm during large-volume flow, in a manner tending to close the admission valve, thus further diminishing the pressure at which the gas leaves the regulator, at the time when maximum pressure is required.

My invention aims primarily to overcome the above difficulties, although further objects are to provide novel and advantageous power-multiplying valve-operating means, to provide for effective valve lubrication, to provide a pressure inlet of such form as to offer least resistance to the fluid, and to provide a generally improved construction which may be easily assembled and disassembled.

With the foregoing in view, the invention resides in the novel subject matter hereinafter described and claimed, description being accomplished by reference to the accompanying drawings.

Fig. 1 is a vertical sectional view of the improved regulator.

Fig. 2 is a horizontal sectional view on line 2—2 of Fig. 1.

Fig. 3 is an enlarged detail sectional view showing the renewable valve.

Fig. 4 is a transverse sectional view on line 4—4 of Fig. 3.

A preferred form of construction has been illustrated and while such construction will be herein specifically explained, it is to be understood that within the scope of the invention as claimed, numerous variations may be made.

A casing 1 is provided, said casing being divided by a diaphragm 2, into an upper chamber 3 and a lower, control chamber 4. Formed under the chamber 4, is a flow passage 5 having upturned ends 6 and 7, the end 6 constituting an expansion chamber for incoming fluid and being provided with an inlet 8, while the end 7 is provided with an outlet 9, and with a restricted port 10 placing it in communication with the chamber 4. The inlet 8 is of Venturi-like form and a valve seat 11 is formed around its inner end, said seat being co-operable with a renewable valve 12 on the end of a horizontal stem 13. This stem passes slidably through an opening 14 in the side wall of the chamber 4 and through another opening 15 in the wall 16 of a grease pocket 17 formed in the lower portion of said chamber 4. The two openings 14 and 15 are below the grease level of the chamber 17 and they are axially alined with the fluid inlet 8.

Spaced inwardly from the stem 13 in the direction of movement of this stem and the valve 12, is a fulcrum 18 which is transverse to said line of movement and is carried by a removable plug 18a. A lever 19 is mounted at one of its ends on the fulcrum 18, between spacing sleeves 18b, said lever carrying two pivots 20 and 21 which are parallel with said fulcrum 18. The pivot 20 is relatively close to the fulcrum 18 and is disposed below the line of movement of the valve 12 and its stem 13, whereas the pivot 21 is comparatively remote from the fulcrum 18 and is disposed above said line of movement. Pivot 20 is connected by two links 22 and the pivot 23 with the inner end of valve stem 13, and pivot 21 is connected by one or more links 24 and the pivot 25 with a head on a bolt 26 passing through the diaphragm 2. The nut 27 of bolt 26 is at the upper side of the diaphragm and is received in a removable cap 28 which is linked at 28a to a lever 29 within the chamber 3. Near one of its ends 30, lever 29 is fulcrumed as indicated at 31, and connected to said lever end 30 is a coiled tension spring 32, the end of said spring remote from the lever being anchored upon a tension-adjusting bolt 33 having a wing nut or the like 34. Nut 34 and a lug 34a on the casing 1, are provided with openings 24b to receive a seal wire when spring 32 has been adjusted to the proper tension.

The relation of lever 29 and spring 32, is such that when the valve 12 is closed, the point 35 at which said spring is connected with said lever is very close to but slightly above dead center (represented by line C on the drawing), the valve 12 being of course held closed by the upward pressure upon the diaphragm 2. With the spring and lever thus related, while said spring is under full tension, it is not exerting as much downward force upon the diaphragm 2, as if point 35 were further above dead center. Whenever the pressure in the chamber 4 diminishes and the spring 32 and lever 29 force downwardly upon the diaphragm 2 to effect opening of the valve 12, the point 35 swings upwardly away from dead center, and thus, even though the spring 32 is contracting and expanding energy, the force which said spring and the lever 39 apply to the diaphragm 2, will be increased as the valve opens, the spring having greater power to swing the lever 29 when point 35 is comparatively distant from dead center than it has when said point is substantially on dead center.

By providing the spring actuated valve opening means 29, 32, etc., embodying means for increasing the applied power of the spring as the valve 12 opens, I provide a structure which effectively overcomes the first difficulty herein explained with regard to conventional pressure regulators, for the valve 12 is held open by such force that passage of additional pressure through the regulator when large-volume flow is taking place, will not immediately overcome such force and again effect partial valve closing. Hence, maximum pressure when large-volume flow is required, is insured.

Another of the distinct improvements which the present regulator possesses, will now be explained as to operation, having been above structurally described. The gas or other fluid entering through the inlet 8 meets with the least possible resistance due to the shape of this inlet. The fluid upon leaving the inlet, immediately expands into the chamber 6, causing the dynamic pressure in the latter, above explained. The port 10 however is sufficiently remote from the chamber 6 to give the dynamic pressure a chance to "settle down" to quiet pressure before any of it passes through said port 10 into the control chamber 4. Consequently by thus segregating all dynamic pressures from the diaphragm or its equivalent, it is insured that such pressures shall not effect undesired movements of said diaphragm, the upward movements of the latter being hence under the sole control of the pressure at the discharge side of the regulator.

Regardless of the pressure at which the valve-operating means must function, the relation of parts 24, 19, 22, etc., provides for effective power multiplication and hence advantageous operation.

At all times, the grease in the pocket 17 effectively lubricates the stem 13, insuring easy operation of the valve. Should any of this grease find its way into the control chamber 4 and the port 10, clogging of the latter cannot take place, for it is of sufficient size to prevent such obstruction.

It will be seen from the foregoing that a generally improved regulator has been provided, particular attention being drawn to the fact that when large-volume flow is taking place, for instance, at a peak hour, the regulator will balance at high pressure instead of low pressure, thus insuring that the fluid shall be delivered to the destination or destinations at a pressure greatly in excess of that which can be attained when using conventional pressure regulators. The provision for segregating all dynamic pressures from the diaphragm or the like 2 is also an important feature of the invention as it overcomes undesired movements of diaphragm and valve. Then too, the power-multiplying connections between the diaphragm and the valve, and the provision for lubricating the valve stem, are important features.

By preference, the renewable valve head 12 is provided with a T head 12$^a$ received in a socket 12$^b$ in the stem 13. This stem is provided with diametrically opposed openings 12$^c$ through which pass the inwardly bent ends or detents 12$^d$ of a U-shaped spring 12$^e$ which embraces the stem 13. These spring ends or detents hold the neck 12$^a$ in place but when the spring 12$^e$ is removed, the valve head 12 may be detached. By then removing plug 18$^a$ and withdrawing the fulcrum 18, all movable parts below the diaphragm 2 may be removed bodily with the latter for inspection and repair. All movable parts above the diaphragm, are removable with the upper diaphragm-clamping part 1$^a$ of the casing 1, cap 28 then disengaging from nut 27. A structure is thus provided which may be easily disassembled for inspection and repair and assembled also with ease.

On account of the existing advantages for the details disclosed, they are preferably followed. However, within the scope of the invention as claimed, variations may be made, as above stated.

What is claimed is:—

1. A pressure regulator comprising a casing having an upper and a lower chamber and a diaphragm between said chambers; said casing having a flow passage under said lower chamber, the ends of said flow passage being turned upwardly around opposed portions of the side wall of said lower chamber, one of said ends constituting an expansion chamber and having a horizontal-axis inlet, the other end of said flow bore having an outlet and a port, the latter opening into said lower chamber, said side wall of said lower chamber being formed with an opening in alinement with said inlet, a stem slidable through said opening and having a valve for said inlet, valve operating means in said lower chamber connected with said stem and said diaphragm, and spring means in said upper chamber acting downwardly on said diaphragm.

2. A structure as specified in claim 1; together with a vertical wall extending transversely across the lower portion of said lower chamber and formed integrally with the bottom of the latter, said vertical wall being opposed to the aforesaid opening and itself having an opening slidably receiving a portion of said stem, whereby a lubricant may be confined between said vertical wall and the side wall of the lower chamber to lubricate said stem.

In testimony whereof I affix my signature.

ROY E. JOYCE.